Sept. 19, 1961 G. E. FORD 3,000,526
BOTTLE CAPS
Filed April 22, 1957 2 Sheets-Sheet 1
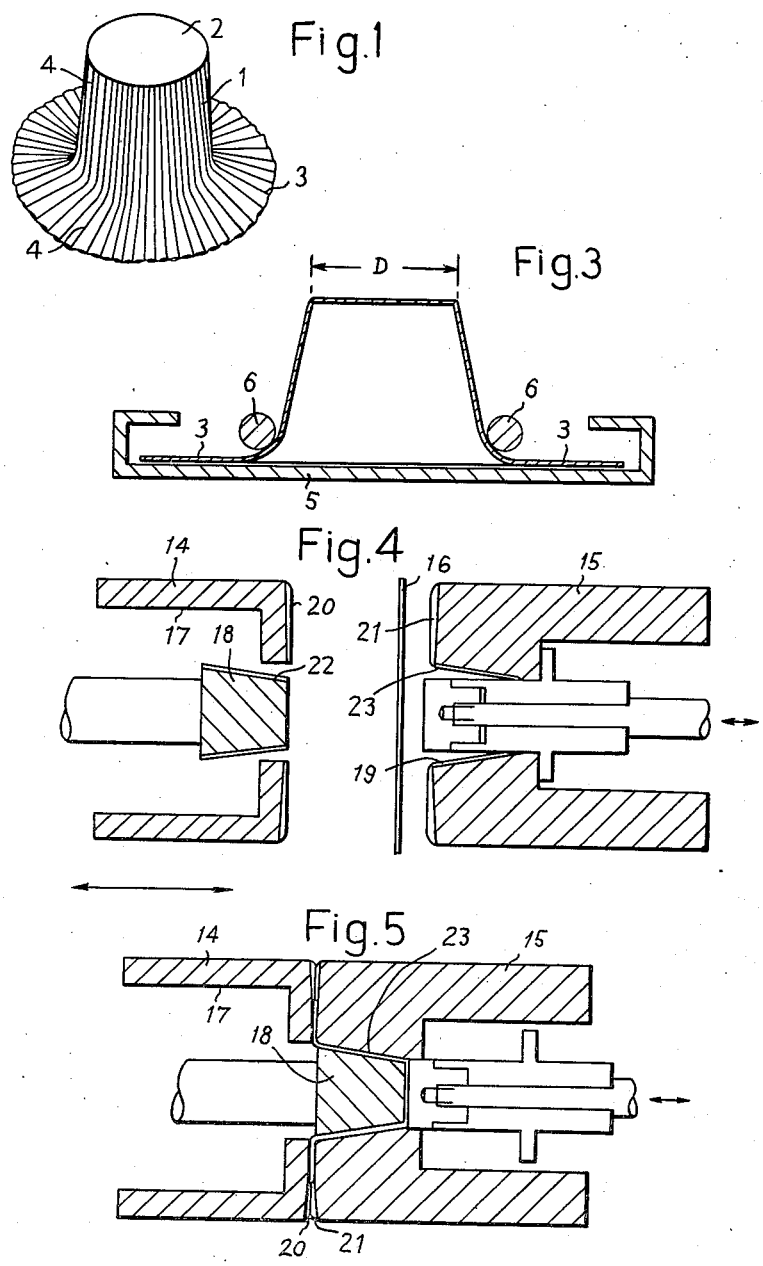
Inventor
Geoffrey Ewart Ford
By
Holcombe, Wetherill & Brisebois
Attorney Sept. 19, 1961   G. E. FORD   3,000,526
BOTTLE CAPS
Filed April 22, 1957   2 Sheets-Sheet 2
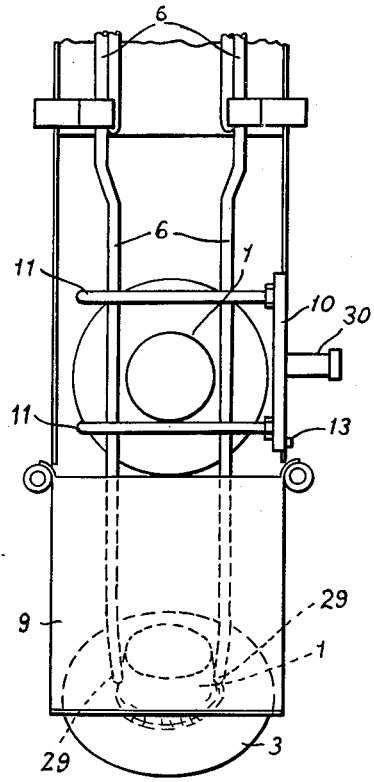
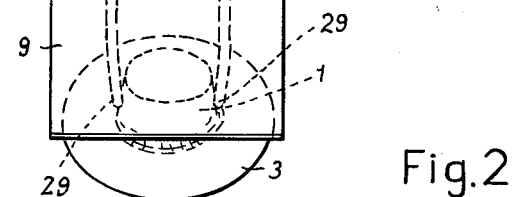
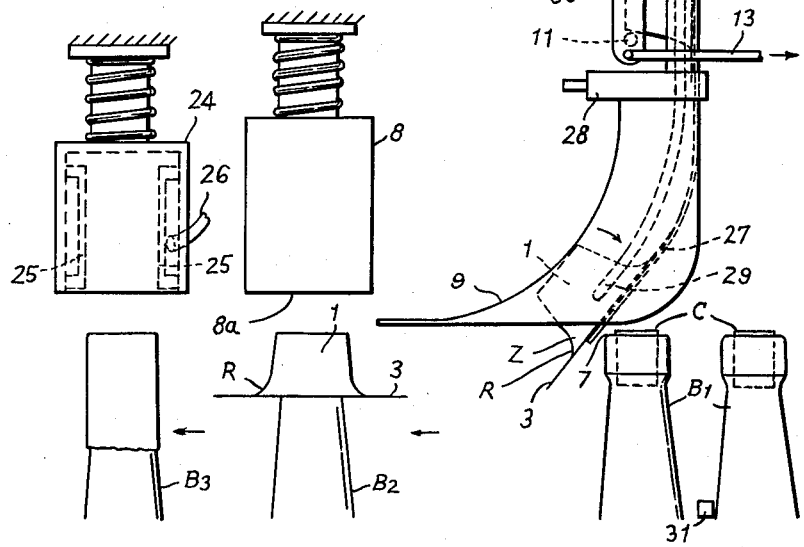
Inventor
Geoffrey Ewart Ford
By
Holcombe, Wetherill + Brisebois
Attorney

3,000,526
BOTTLE CAPS

Geoffrey Ewart Ford, Bedford, England, assignor to Fords (Finsbury) Limited, Bedford, England, a British company
Filed Apr. 22, 1957, Ser. No. 654,156
Claims priority, application Great Britain Feb. 28, 1957
4 Claims. (Cl. 215—38)

The present invention relates to metal foil crimped caps or capsules for bottles or the like, and to methods for guiding or feeding them to a capping position or station in a capping machine.

According to the invention there is provided a method for manufacturing a crimped or pleated metal foil cap for bottles or the like in which a strip of foil is compressed between a pair of opposed die members of a press tool so as to form in a single operation a cap having a portion of generally cylindrical shape but tapering slightly towards an upper closed end and a flange projecting radially outwards from the other end thereof.

The invention also provides a method for manufacturing a crimped or pleated metal foil cap for bottles or the like, in which a flange projecting radially outwards from the open end of a portion of the cap of generally cylindrical shape tapering towards a closed end is formed simultaneously with said generally cylindrical portion.

The invention furthermore provides a crimped or pleated metal foil cap for bottles or the like comprising an upper portion of generally cylindrical shape but tapering slightly towards an upper closed end and a flange projecting radially outwards from the other open end thereof, the length of the upper portion being nearly as great as the diameter thereof.

According to one feature of the present invention the cap referred to above is radiussed at the transition portion between the generally cylindrical but tapering upper portion and the radially projecting flange portion.

The material from which the cap is made is preferably aluminium, although lead or other foils may be used if desired.

According to a second feature of the invention there is provided a method for guiding or feeding caps of this kind and other objects of a similar shape, in which the objects are contacted on opposite sides of the upper portion at or about the radiussed zone referred to whilst passing along a planar surface such as a chute to the capping station or any other desired operational position.

The contact may be effected by guide members which comprise rods or wires longitudinally disposed along a chute of which said planar surface forms a part, and the chute may be provided with a flanged edge which is turned back upon. In an alternative the inner free edge of the inwardly turned part of the flange may be rounded or otherwise prepared so as to act as the guide members.

According to another feature means may be provided for holding the caps in controlled relationship with the speed of operation of a capping mechanism of a capping machine so that the caps are fed to the capping station singly the said holding or stopping means acting to dam the flow of caps from a cap-making machine feeding the chute and releasing said caps one at a time to the capping station.

According to another feature of the invention the ratio between the radially projecting flange and the diameter of the upper portion of the cap, and the amount of taper thereof are such that when a bottle contacts a cap projecting from the end of a feed chute the location, disposition and interrelationship of the parts enables the cap to fall neatly over the mouth of the bottle without jamming thereacross. It will be appreciated that this is important since the upper portion of the cap is relatively long.

The cap according to the invention may be made by means of a press tool that comprises a pair of opposed annuli having their co-adjacent faces radially ribbed and grooved in interfitting fashion and between which a foil blank is pressed. A plunger member is arranged to pass through the bore of one of the annuli so as to draw the material of the blank into a cylindrical portion which is closed at one end. The outer surface of the plunger and the said bore of one of the annuli are provided with shallow longitudinal ribs and grooves, and, as a result of the pressing operation, a cap having a cylindrical portion closed at one end and a flange projecting radially outwards from the other end thereof is produced and having a surface which is crimped or pleated longitudinally of the cylindrical portion and radially with respect to the flange portion.

In order that the invention may be more clearly understood reference will now be made to the accompanying drawings which show one specific embodiment of cap and tools for making same by way of example and for guiding or feeding them and in which:

FIGURE 1 shows a perspective view of a cap,

FIGURE 2 shows a part sectional view of caps in position for sliding down a feed chute towards a capping station, FIGURE 3 shows a cross-sectional view of a cap in the chute of FIGURE 2, FIGURE 4 shows schematically and in section part of a press tool for making a cap from a blank, in the open position, FIGURE 5 shows the tool of FIGURE 4 in the closed position having formed a cap from the blank, and FIGURE 6 shows a front view of the chute.

Referring to the drawings, a cap according to the invention is shown in FIG. 1 in which 1 indicates the upper portion of generally cylindrical shape but tapering slightly to the upper closed end 2, and 3 shows a flange projecting radially outwards from the other, open end of the cap. The surface of the cap is pleated or crimped as shown at 4.

In the industry of capping wine bottles with caps having a very long skirt, caps according to the invention produce many advantages. The known caps cannot successfully be fed automatically from the forming press to the capping head of the machine because they cannot be stood on their edges as they are unstable in this position and moreover handling in any position is liable to cause deformation. However, with caps according to the invention the length of the cap is virtually halved and because the flange portion 3 has a materially larger area than the upper portion 1, the flange makes a stand or base upon which the cap may stand and be supported in a stable condition. Moreover, the cap may be moved across tools used for forming it when they are separated in a direction parallel to the plane thereof. Furthermore, due to the fact that the cap is easily self-supporting by standing upon the said flange 3 it can be delivered, for example by means of a blast of air, to a sealing tool or may be dropped down a delivery chute for example as illustrated by FIGS. 2 and 3, the chute being shown at 5, the flange 3 of the cap being suitably guided down the chute by means of rods or wires 6 located longitudinally of the chute 5 which may also bare a flanged edge as shown.

A cap according to the invention may be readily applied to a bottle B1 passing the end of the chute where a single cap is arranged to be located in readiness, the bottle impinging against a zone including the radiussed portion near the radial flange of the cap so as to tip the cap over and on to the bottle neck. The bottle itself is closed e.g. by a cork C, As shown in FIGURE 2, when the bottle B1 arrives in the direction of the arrow at the lower end of chute 5 the forward edge 7 of the bottle neck contacts the zone Z including the radiussed portion R and the flange 3 of the depending cap and causes the cap to tilt in the clockwise direction as shown by the arrow. The ratio between the radially projecting flange 3 and the diameter D (FIG. 3) of the closed end of the cap and the amount of the taper of the upper portion thereof (whereby the open mouth of the cap is larger than the diameter D) enables the cap to fall neatly over the bottle as shown at B2 when it leaves the end of the chute to pass to a capping station or sealing head schematically shown at 24. In certain circumstances it may be preferable to pass the bottle to a preliminary capping station or head, schematically shown at 8 and having a tapered mouth 8a. The bottle is pushed upwards into the mouth 8a, or the head is lowered over the bottle, so that the flange 3 is folded downwards about the bottle neck. The bottle B3 is then passed to the sealing head 24 having means for sealing or closing the cap firmly against the bottle neck and shaping it substantially to the contours of the said neck. The closing means referred to may comprise a sheath 25 internally expansible against the cap e.g. by hydraulic pressure conveyed by a conduit 26. Sealing heads for performing this function are well-known in the art.

In order to retain a cap at the end of the chute ready for application to an oncoming bottle the guide rods 6 are curved forwardly, i.e. in the direction of travel of the bottles and at their lower ends also taper inwardly slightly at 29 as shown more particularly in FIG. 6 the width between the extreme ends of the rods being very slightly less than the diameter of the cylindrical portion of the cap with which they come into contact so as to stop the cap in the downward travel. The rear face of the chute shown at 27 is also forwardly curved in the direction of travel of the bottles and is provided with a cut-out central portion to allow the neck of the bottle to pass therethrough. A hood 9 e.g. of sheet metal is also provided at the end of the chute to which it may be secured by means of the rods 28 and the distance between the inside face of the hood 9 and the rear face 27 of the chute and the inwardly tapering ends 29 of the guide rods 6 is such that the cap is securely although lightly held in the position as shown in FIG. 2 to allow the oncoming bottle to contact the zone referred to above. The side walls of the hood 9 assist in preventing inadvertent removal of a cap.

In order to prevent the supply of too many caps to the chute from a cap-forming press to which it is preferably connected but which is not shown in the drawings, means are provided to hold the cap in an automatically-freed gate or the like near the end of the chute. Such a gate is schematically shown in FIG. 2 and may comprise a plate member or the like 10 to which a pair of horizontal rods 11 are secured so as to engage over the flange 3 to retain the cap in the chute, means being provided to release the cap in timed relation with the oncoming bottles. For example the plate 10 as shown is pivotally mounted on a pivot 30 so that when the plate 10 is pivoted in clockwise direction, referring to in FIG. 2, the lower rod 11 swings out of the way and allows the cap to fall down the lower end of the chute where it is lightly trapped by the inwardly-tapering ends 29 of the guide rods 6 and the hood 9 and rear face 27 of the chute as described above. The upper rod 11 is thus moved closer towards the guide rods 6 so that when the next cap proceeds down the chute the upper rod 11 stops it and temporarily prevents it dropping further. The plate 10 is then pivoted in an anticlockwise direction so that the upper rod 11 is moved out of the way of the cap and the lower rod 11 moves towards the guide rods 6 whereby the cap is held on the said lower rod 11. The plate 10 is then moved slightly to return to its original position so as to entrap a single cap within the gate constituted by both transverse rods 11 and the guide rods 6, as can be seen more particularly in FIG. 6. In order to obtain the movement of the plate 10 a link 13 is attached to the lower end thereof and this link forms part of a linkage which may be connected to the clutch of the cap-forming press referred to above so as to effect delivery of the caps one at a time in dependence upon the operation of the cap-making press itself. In order to secure timed relation of the arrival of caps with the arrival of bottles the bottles are arranged to contact a lever 31 during their approach to the chute which lever also is connected to the press in such a manner that the incoming bottle causes the clutch of the press to be operated thereby to release a cap from the gate so that the cap is ready for application by the time the bottle reaches the end of the chute as shown in FIG. 2.

As can be seen more particularly in FIG. 6, the guide rods 6 are relatively widely spaced apart at the upper end of the chute to compensate for any deviation in transverse position of caps as they drop into the chute from the press. Just above the gate the rods curve inwards as shown to centralise the caps. The gate serves two purposes—it allows the synchronisation of cap and bottle arrival to be readily effected and acts as a stop for the cap which, if it were allowed to fall freely for the whole height of the chute it might fall by its own impetus right through the inwardly-tapered ends of the rods 6. The amount of this inward taper is very slight and only sufficient slightly to punch the cap to hold it in position at the end of the chute.

The flange 3 also assists in normal handling of the caps without distorting them, even when they are made from material having a thickness of the order of only 0.02" to 0.025".

FIGS. 4 and 5 illustrate part of a press tool suitable for manufacturing caps according to the invention and comprising a male die member or crimping tool 14 and a female die member or crimping tool 15 between which a blank 16 of foil is passed. The blank 16 is preferably formed from a strip of foil which may be automatically cut so as to feed the blank between the crimping tools but since arrangements for stamping out suitable blanks are well known in the art to which this invention relates it is not thought necessary to illustrate them here.

The male and female die members of crimping tools comprise annuli as shown and through the bore 17 of the male die member there is arranged to pass a plunger 18 the said plunger drawing the material of the blank into the bore 19 of the female die member 15 so as to form a cap of the shape shown in perspective in FIG. 1.

In FIG. 4 the tools are shown separated and in FIG. 5 closed. To form the cap the male member 14 may be advanced towards the female member 15 so that the outer circumferential portion of the blank 16 is gripped between the two die members whereupon the plunger 18 is advanced from the male member 14 so as to draw the material of the central portion of the blank 16 into the bore 19 of the member 15 so as to form the cap as is shown in FIG. 4.

The co-adjacent faces of the die members 14 and 15 are radially ribbed and grooved in interfitting fashion at 20 and 21. The outer surface of the plunger member 18 and the bore 19 of the female member 15 are also provided with longitudinal ribs and grooves 22 and 23 so that after the pressing operation the whole of the surface of the cap will be pleated or crimped as shown in the perspective view of FIG. 1.

It will be appreciated that the shape of the cap may depart from the exact shape shown.

I claim:
1. A method for manufacturing a pleated metal foil cap for bottles, comprising the steps of locating a disc blank of foil between a pair of opposed complementarily ribbed and grooved annular die members, applying relative compressing pressure to said die members to compress said disc blank of foil over a wide peripheral area thereof, passing a slightly tapered and substantially flat-ended forming plunger through said annular die members to draw out the central part of said disc blank and form it into a slightly upwardly converging crown having a substantially flat top, arresting the movement of said plunger whilst leaving said wide peripheral area of said disc between said die members thus to form a wide flange extending radially outwards from said crown, and separating said die members to eject the formed cap.

2. A method for manufacturing a pleated metal foil cap for bottles, comprising the steps of locating a disc blank of foil between a pair of opposed complementarily ribbed and grooved annular die members, applying relative compression pressure to said die members to compress press said disc blank of foil over a wide peripheral area thereof, passing a longitudinally ribbed and grooved slightly tapered and substantially flat-ended forming plunger through said annular die members to draw out the central part of said disc blank and form it into a slightly upwardly converging crown having a substantially flat top, arresting the movement of said plunger while leaving said wide peripheral area of said disc between said die members thus to form a wide flange extending radially outwards from said crown, and separating said die members to eject the formed cap.

3. A thin and flexible pleated metal foil cap comprising a crown portion and a flanged skirt, said crown portion tapering slightly towards its upper, closed, end and having a height substantially equal to its diameter, and said flanged skirt extending radially outwards from the lower, open, end of said crown and having a diameter substantially equal to twice the diameter of said crown.

4. A thin and flexible pleated metal foil cap comprising a crown portion and a flanged skirt, said crown portion tapering slightly towards its upper, closed, end and having a height substantially equal to its diameter, and said flanged skirt extending radially outwards from the lower, open, end of said crown and having a diameter substantially equal to twice the diameter of said crown, and wherein the transition portion of said cap between said flanged skirt and said crown portion is smoothly radiussed.

References Cited in the file of this patent

UNITED STATES PATENTS

| | | |
|---|---|---|
| 1,131,676 | Cake | Mar. 16, 1915 |
| 1,138,588 | Augensen | May 4, 1915 |
| 1,607,091 | Lucas | Nov. 16, 1926 |
| 1,955,745 | Hurley | Apr. 24, 1934 |
| 2,014,297 | Rutledge | Sept. 10, 1935 |
| 2,036,737 | Wright et al. | Apr. 7, 1936 |
| 2,114,297 | Grover | Apr. 19, 1938 |
| 2,119,662 | Williams | June 7, 1938 |
| 2,131,438 | Jensen | Sept. 27, 1938 |
| 2,170,040 | Stuart | Aug. 22, 1939 |
| 2,497,870 | Dennis | Feb. 21, 1950 |
| 2,609,775 | Gaudreau | Sept. 9, 1952 |
| 2,706,572 | Tocco | Apr. 19, 1955 |
| 2,775,383 | Kollmran et al. | Dec. 25, 1956 |
| 2,843,071 | Kitzinger | July 15, 1958 |

FOREIGN PATENTS

| | | |
|---|---|---|
| 55,280 | Denmark | Sept. 19, 1938 |
| 703,351 | Great Britain | Feb. 3, 1954 |